United States Patent
Wiest et al.

(10) Patent No.: US 10,283,102 B2
(45) Date of Patent: May 7, 2019

(54) ULTRASONIC TRANSDUCER AND ULTRASONIC FLOW MEASURING DEVICE

(71) Applicant: Endress + Hauser Flowtec AG, Reinach (CH)

(72) Inventors: Achim Wiest, Weil am Rhein (DE); Andreas Berger, Hasel-Glashutten (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 178 days.

(21) Appl. No.: 15/127,471

(22) PCT Filed: Feb. 23, 2015

(86) PCT No.: PCT/EP2015/053684
§ 371 (c)(1),
(2) Date: Sep. 20, 2016

(87) PCT Pub. No.: WO2015/139918
PCT Pub. Date: Sep. 24, 2015

(65) Prior Publication Data
US 2017/0132997 A1    May 11, 2017

(30) Foreign Application Priority Data
Mar. 21, 2014  (DE) .......................... 10 2014 103 884

(51) Int. Cl.
*G10K 9/122* (2006.01)
*G01F 1/66* (2006.01)
(Continued)

(52) U.S. Cl.
CPC ............. *G10K 9/122* (2013.01); *G01F 1/662* (2013.01); *G01H 9/008* (2013.01); *G01H 11/08* (2013.01); *G10K 9/22* (2013.01)

(58) Field of Classification Search
None
See application file for complete search history.

(56) References Cited

U.S. PATENT DOCUMENTS

| 2011/0079351 A1 | 4/2011 | Furuta |
| 2012/0252996 A1* | 10/2012 | Cho ....................... A61K 31/06 526/268 |

(Continued)

FOREIGN PATENT DOCUMENTS

| CN | 1541327 A | 10/2004 |
| CN | 103477194 A | 12/2013 |

(Continued)

OTHER PUBLICATIONS

German Search Report, German Patent Office, Munich, DE, dated Dec. 2, 2014.

(Continued)

*Primary Examiner* — Clayton E. LaBalle
*Assistant Examiner* — Dennis Hancock
(74) *Attorney, Agent, or Firm* — Bacon & Thomas, PLLC

(57) ABSTRACT

An ultrasonic transducer comprising a coupling element and a piezo element, wherein a metal disk is arranged between the coupling element and the piezo element, wherein the metal disk is connected with the piezo element or with the coupling element by means of an adhesive layer, characterized in that the adhesive layer is producible, at least in certain regions, by means of a photochemically curable adhesive.

9 Claims, 2 Drawing Sheets

(51) Int. Cl.
*G01H 9/00* (2006.01)
*G10K 9/22* (2006.01)
*G01H 11/08* (2006.01)

(56) References Cited

U.S. PATENT DOCUMENTS

2014/0086017 A1  3/2014  Nakano
2016/0116318 A1  4/2016  Wiest

FOREIGN PATENT DOCUMENTS

| | | |
|---|---|---|
| DE | 102009046149 A1 | 5/2011 |
| DE | 10 2012 207 873 A1 | 11/2013 |
| DE | 102012207871 A1 | 11/2013 |
| DE | 102013104542 A1 | 11/2014 |
| DE | 102014103884 A1 | 9/2015 |
| EP | 0974814 A1 | 1/2000 |
| EP | 0974814 B1 | 1/2000 |
| WO | 2015139918 A1 | 9/2015 |

OTHER PUBLICATIONS

International Search Report, EPO, The Netherlands, dated Apr. 24, 2015.
English Translation of the International Preliminary Report on Patentability, WIPO, Geneva, CH, dated Oct. 7, 2016.
Office Action dated Sep. 30, 2018, issued in corresponding Chinese Application No. 201580015514.7.

* cited by examiner

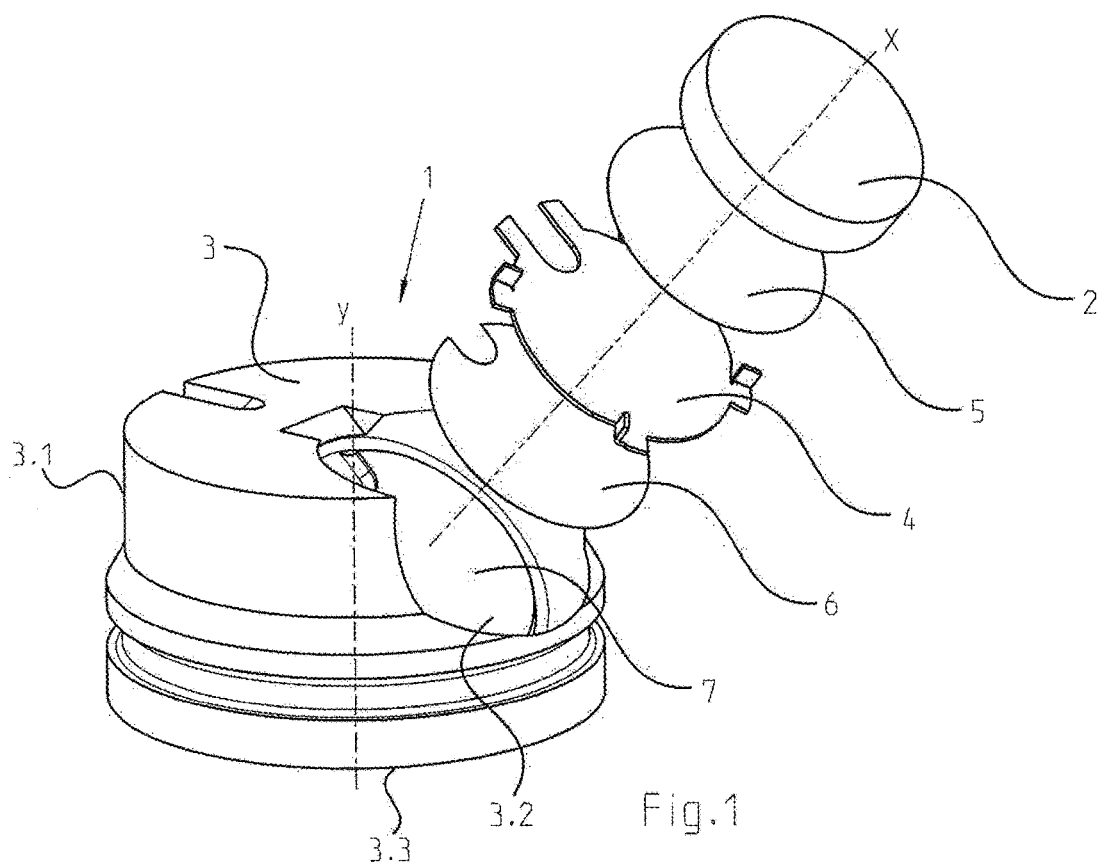
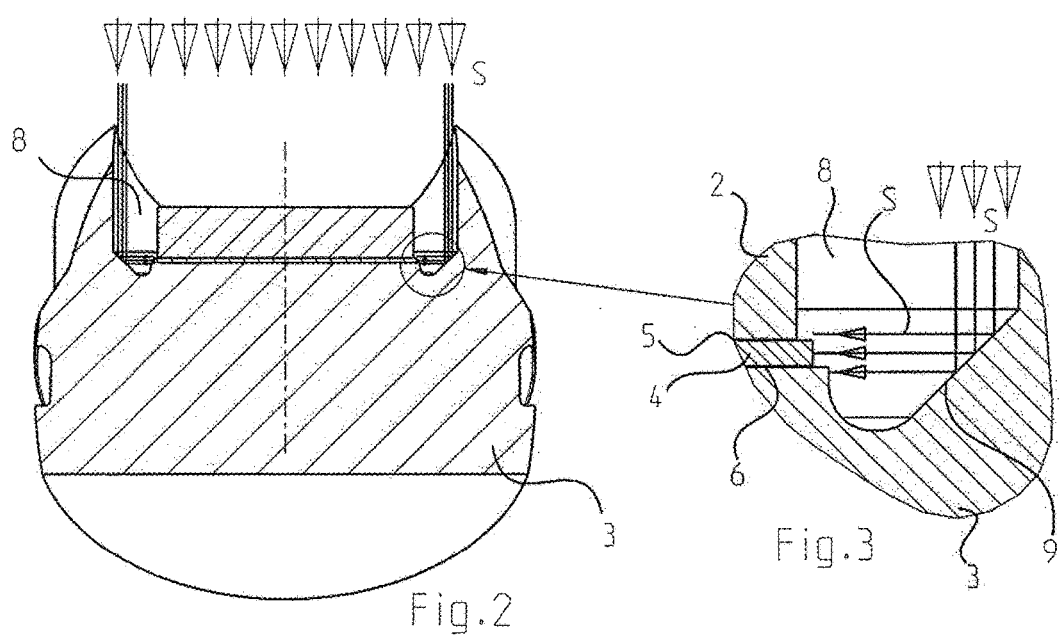

ULTRASONIC TRANSDUCER AND ULTRASONIC FLOW MEASURING DEVICE

TECHNICAL FIELD

The present invention relates to an ultrasonic transducer and to an ultrasonic, flow measuring device.

BACKGROUND DISCUSSION

A large number of different variants and layer sequences of ultrasonic transducer structures are already known.

European Patent, EP 0 974 814 B1 of the field of the invention describes a coupling element having a bearing surface, respectively contact surface. The coupling element has a cavity for accommodating a piezo element. Arranged between the coupling element and the piezo element is a metal disk. This metal disk is adhered in a plane inclined to the bearing surface and forming a base of the cavity. This construction with integrated metal disk has basically proved itself and is distinguished in comparison to glass- and ceramic disks through its high loadability in the face of variable temperature loading.

In the manufacture of a plurality of layers, such as in EP 0 974 814 B1, attention is to be given that the elements are oriented relative to one another as accurately as possible. Thus, e.g. the metal disk should be oriented as parallel as possible to the ultrasonic transducer. In such case, an adhesive can be utilized. During the curing of the adhesive, a shifting of the individual components can be experienced e.g. due to transport related shaking or for other reasons.

It is, consequently, of interest to achieve an as fast as possible fixing of the individual components in place. A faster curing of the adhesive e.g. by overdosing of hardener or an increased temperature regimen can, however, lead to stress cracks or otherwise negatively affect the properties of the coupling element or lead to disadvantageous effects (among others, air bubbles) within the adhesive layers. In these cases, the ultrasonic transducer is lacking in quality.

German Patent, DE 10 2012 207 871 A1 discloses the application of a photochemically curable adhesive for affixing an intermediate layer. In this publication, it is, however, explicitly required that the intermediate layer to be affixed should be at least partially transparent. In such case, primarily a full surface curing of the adhesive is assumed, so that, as much as possible, a full surface irradiation is provided. A metal disk, as a heat conduction capable, intermediate layer, as is provided in EP 0 974 814 B1, consequently goes against the concept of DE 10 2012 207 871 A1, since it is not transparent.

Moreover, in German Patent, DE 10 2013 104 542 A1, an ultrasonic transducer element with a coupling layer is described, in which likewise a metal disk is applied.

SUMMARY OF THE INVENTION

It is an object of the present invention to provide an ultrasonic transducer, which is rapidly producible and, in given cases, with least possible temperature loading.

The invention achieves this object by an ultrasonic transducer including a coupling element and a piezo element, wherein between the coupling element and the piezo element a metal disk is arranged. The metal disk is connected with the piezo element by means of an adhesive layer.

The metal disk is provided to be covered by the piezo element and can be arranged in a cavity of the coupling body. Additionally, this metal disk can also be provided with an additional layer of a non-metallic material.

Ideally, the metal disk has a preferred layer thickness of less than $\frac{1}{8} \lambda$ (lambda), preferably less than $\frac{1}{16} \lambda$. It does not perform the function of an acoustic matching, but, instead, only provides thermal adjustment between the piezo element and layers arranged therebeneath—respectively the coupling element and, in given cases, an adapting, or matching, layer. The metal disk has, in such case, preferably a thermal coefficient of expansion of less than 30 ppm/K, especially preferably less than 25 ppm/K. The metal disk should be as flat as possible, in order that it lead to no angular displacement between the plane of the base of the coupling element relative to the plane of the piezo element. The flatness of the metal disk amounts, in such case, preferably, to less than $\frac{1}{16}$, especially less than $\frac{1}{32}$ lambda.

In a first variant of the invention, the adhesive layer is at least in certain regions producible by means of a photo-chemically curable adhesive.

In a second variant of the invention, the adhesive layer is at least in certain regions producible from an adhesive, which contains at least one micro-encapsulated polymerization activating component, which is releasable under the action of ultrasonic waves.

The curing can, in such case, be introduced by the in any event present piezo element of the ultrasonic transducer. Thus, the adhesive can be directly activated and cured by the ultrasonic waves emitted by the piezo element.

In a third variant of the invention, the adhesive layer is at least in certain regions producible from an adhesive, which contains at least one polymerization activating component, which is activatable under the action of microwaves. A corresponding component can be e.g. a polymerization initiator, which, however, is first activated for polymerization by energetic microwave input. In a subvariant, a polymerization activating component can also be present in a micro-encapsulation, wherein the micro-capsule is destroyed by the microwaves and the component, in this way, released and, thus, activated.

In a fourth variant of the invention, the adhesive layer is, at least in certain regions, enriched with a component, which is inductively heatable under the action of LF- or HF-fields. This can be, for example, ferromagnetic alloys or metals such as nickel-iron.

Advantageous embodiments of the invention are subject matter of the dependent claims.

The cured adhesive layer can have unreacted photo initiators or residual monomers, with functional groups, which form chemical bonds or radicals under photochemical irradiation. The cured adhesive layer can preferably have residues of a micro-encapsulation. The cured adhesive layer can additionally have residues of a component absorbing LF- or HF-fields. The adhesive layer can additionally have residues of a microwave absorbing component, such as e.g. ferromagnetic particles.

The metal disk can have an area facing the piezo element with a geometric center of gravity, wherein the degree of crosslinking of the polymer decreases toward this center of gravity. This means, for example, that the polymer on the edge of the adhesive layer is subjected to an increased polymerization process as compared with the center. This form of a laterally increased degree of polymerization can be initiated by lateral irradiation. This is explained in greater detail with reference to FIGS. 2-8.

For an exactly fitting orienting of the metal disk and of the piezo element relative to the coupling body, it is, consequently, advantageous to perform a pre-affixing, or tacking, before the actual curing. The pre-affixing enables a securement of the piezo element and the metal disk with the coupling body.

The adhesive layer can be cross-linked in an edge region of the metal disk photochemically or by microwave incidence and thermally cross-linked in a central region. This can be observed, for example, by noting that photo initiator molecules are still unactivated in the center of the adhesive layer and not connected as components of a polymeric network, but, instead, are surrounded in increased concentration only by a polymeric material, without forming of chemical bonds or at least no bonds activated by irradiation.

The coupling body, respectively the coupling element, can have a coupling surface facing the measured medium for the in- and/or out-coupling of an ultrasonic, wanted signal into and out of the coupling element, and wherein the coupling element has at least one reflecting surface, which redirects radiation, especially UV radiation or microwave radiation entering from the coupling surface into the coupling element into the edge region of the metal disk. In this variant, the reflecting surface is provided by the coupling element. Additionally or alternatively, also a reflecting coating can be provided.

Additionally, a focusing of the radiation can occur on the reflecting surface.

The adhesive layer can especially be a 2-component adhesive, wherein at least one component is surrounded by the micro-encapsulation. Polymerization can occur after destruction of the micro-encapsulation.

The coupling body can advantageously be at least partially transparent and/or microwave transmissive. For example, upon irradiation of the adhesive from the coupling body toward the metal disk, curing of the adhesive occurs without additional measures.

The adhesive layer between the metal disk and the coupling body can have the same chemical composition as the adhesive layer between the metal disk and the piezo element.

An ultrasonic, flow measuring device of the invention for ascertaining the flow velocity or the volume flow of a measured medium includes a measuring tube and at least two ultrasonic transducers, as claimed in one of claims 1-4, arranged along the measuring tube, wherein each of the ultrasonic transducers has the coupling element with a coupling surface, at which a produced ultrasonic signal can be transmitted or received into or out of the measuring tube or measured medium.

Also only one of the two adhesive layers can be provided in the region of the metal disk. Thus, a λ/4-adapting, or matching, layer can also be provided between the metal disk and the coupling element instead of the adhesive layer, as is described in detail in DE 10 2013 104 542 A1, to which comprehensive reference is taken relative to this variant of the construction of an ultrasonic transducer. This concept is known to those skilled in the art. Of concern here is an adapting, or matching, layer having a layer thickness, which corresponds to a multiple of a fourth of the wavelength of the ultrasonic signal in the material of the adapting, or matching, layer, wherein the layer thickness can, depending on acoustic requirements at the bandwidth, also deviate by ±25% from this value. This is in contrast to a typical adhesive layer, whose layer thickness lies at under ⅜ lambda.

BRIEF DESCRIPTION OF THE DRAWINGS

The subject matter of the invention will now be explained in greater detail based on a number of examples of embodiments in the appended drawing, the figures of which show as follows:

FIG. 1 is an exploded view of a first ultrasonic transducer of the invention;

FIG. 2 is a sectional view of the first ultrasonic transducer;

FIG. 3 is a detail view of the ultrasonic transducer of the invention;

DETAILED DISCUSSION IN CONJUNCTION WITH THE DRAWINGS

Figure 5:
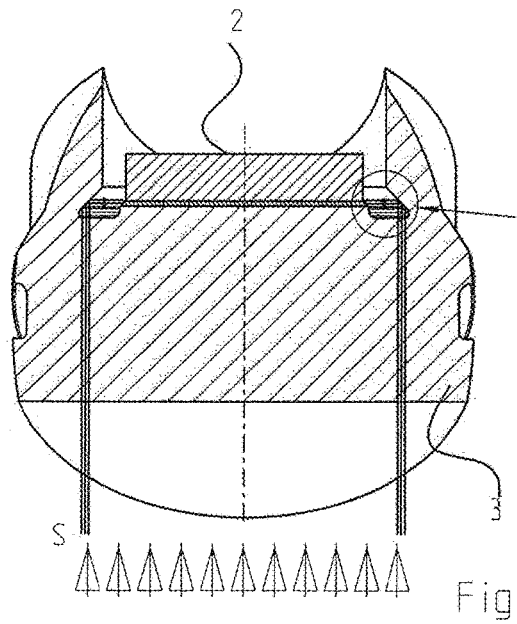
FIG. 5 is a sectional view of a third ultrasonic transducer of the invention.

FIG. 1 shows an ultrasonic transducer 1 of the invention including a coupling element 3.

The ultrasonic transducer 1 comprises an arrangement of a piezo element 2, a metal disk 4 and a coupling element 3. Arranged between the piezo element 2 and the metal disk is a first adhesive layer 5. Arranged between the metal disk 4 and the coupling element 3 is a second adhesive layer 6.

Coupling element 3 is often also called a coupling body. Very often, coupling elements are embodied to have a wedge shape, so that those skilled in the art also speak of a coupling wedge.

In the present example of an embodiment, the coupling element 3 is embodied as a coupling wedge. The basic form of the coupling element is cylindrical with a lateral surface 3.1 and two main surfaces 3.2 and 3.3. In such case, one of the two main surfaces 3.2 is tilted relative to the other main surface 3.3, so that a normal vector X of the main surface 3.2 is at an angle to the normal vector Y of the main surface 3.3. The normal vector X of the main surface 3.2 is, in such case, the same as the normal vector at least of the piezo element 2 and/or the metal disk 4. Main surface 3.3 serves as coupling surface and leads an ultrasonic, wanted signal in the case of a clamp-on ultrasonic, flow measuring device into the tube wall of a media conveying tube. In the case of a so-called in-line flow measuring device, thus a device with a fixedly installed measuring tube, the ultrasonic, wanted signal can also be introduced directly into the medium.

The coupling element 3 shown in FIG. 1 has a special cavity 7 in the form of an inclined bore, in which the piezo element 2 and the metal disk 4 are securable.

Cavity 7 in the coupling element 3 in the present example of an embodiment is a cylindrical recess containing the circularly shaped, main surface 3.2. Depending on shape of the piezo element 2, however, also other geometric forms are conceivable. Thus, the main surface 3.2 in cavity 7 can be square or rectangular, for example.

At the main surface 3.2, the greater part, thus greater than 50%, of the ultrasonic signal produced by the piezo element is introduced into the coupling element 3. At the same time, the angular deviation of the main surface 3.2 from a parallel orientation to the main surface 3.3 defines the angle of incidence of the ultrasonic signal into the measured medium.

Introduced into the cavity is an adhesive for adherring the coupling element 3 with the metal disk 4. This forms, after its curing, the second adhesive layer 6. The terminology, adhesive, in the sense of the invention means any substance, which is curable and in this cured state provides an affixing between two elements, here the metal disk 4 and the coupling element 3 or the metal disk 4 and the piezo element 2.

The adhesive layers have especially a thickness of up to a maximum of 1 mm thick, preferably, however, a maximum of 0.5 mm thick. Alternatively, the bonding between the metal disk 4 and the coupling element 3 can occur through use of a potting compound of thickness equaling a multiple of lambda/4.

Four variants of the invention can be used for forming the adhesive layer. In each case, the object of a fast fixing of the individual components at lesser temperature loading is solved in a different manner.

For forming the first and/or second adhesive layer 5, 6 according to a first variant of the invention, a photochemically curable adhesive can be utilized.

To the corresponding photochemical adhesives belong, among other things, the UV adhesives, which can be obtained e.g. from the the firm, Loctite.

One option is that a one-component or multi-component adhesive is activated upon UV irradiation and forms bonds. This is the case, for example, for photo initiated curing acrylates. Alternatively, also a so called photo activator can be utilized, which is first of all activated by exposure to UV-light, for example, with radical formation, and then these radicals excite other components of the adhesive for chain reaction/cross-linking.

Suitable fundamental systems for adhesive components are e.g. acrylates, polyurethanes or epoxide resins. The curing can be enabled, for example, using an LED curing lamp, e.g. a Delolux 80 lamp. The temperature rise, is, in such case, significantly less than with a conventional discharge lamp. The light wavelength is preferably in the range, 300 to 480 nm.

For forming the first and/or second adhesive layer 5, 6 according to a second variant of the invention, an adhesive can be used, which contains at least one micro-encapsulated polymerization activating component, which is releasable under the action of microwaves.

Micro-encapsulations are known per se and are applied extensively e.g. in the foods industry. Also, micro-encapsulated adhesives are known per se (see "Kleben—Grundlagen, Technologien, Anwendungen (Adhesive Bonding—Fundamentals, Technologies, Applications)"; sixth updated edition, pages 238-240). Such adhesives are applied e.g. in the case of the adherring of screws, where the micro-capsules are destroyed by the shearing. Such adhering, thread pre-coats are used e.g. in products of the firm, PreLok. Micro encapsulations with enclosed adhesive components are producible, for example, by the so-called drop method. In such case, at least one component is present in the micro-encapsulation, for, in given cases, together with additional components, triggering a polymeric chain reaction. Such component can be, for example, a hardener. In the case of epoxides, the hardener can be, for example, a multiple amine (e.g. diethylenetriamine). Alternatively, also a component of the adhesive, e.g. a polyol, can be enclosed in the micro-encapsulation.

High energy microwave radiation enables a bursting of the micro-encapsulations. In this way, polymerization occurs and/or cross-linking of already existing polymer chains.

Additionally, the micro-encapsulation, the encapsulated components and/or the unencapsulated components can advantageously include other ingredients, which strongly heat up under microwave irradiation or by induction and thereby pointwise develop heat, which supports the polymerization- and/or cross-linking reaction. A greater external heat input, which burdens the other components, e.g. the coupling body or the piezo element, is, consequently, not necessary or at least only necessary to a lesser degree. These other ingredients are heat absorbing particles, thus e.g. metal particles.

For forming the first and/or second adhesive layer 5, 6 according to a third variant of the invention, an adhesive can be used, which contains at least one micro-encapsulated polymerization activating component, which is releasable under the action of ultrasonic waves.

Such a technology is applied e.g. in the medical field, in order to release ultrasonic, contrast means by way of ultrasonic action. A corresponding technology and the micro-encapsulations are described in EP 0 977 594 B1, to which comprehensive reference is taken.

In contrast to the technology there, the micro-encapsulation in the present case is utilized for enclosing an adhesive component. The micro-encapsulations can be made to burst by the ultrasonic waves of the piezo element 2 of the ultrasonic transducer 1. In this way, the arrangement provided for measuring is also utilized for its manufacture. For this, the piezo element can be supplied with an excitation energy during the manufacturing process, which is higher than the usual excitation energy for the measuring mode.

Also, in the present case, the micro-encapsulation, the encapsulated and/or the unencapsulated component can contain ingredients, which strongly heat up under microwave irradiation or by induction and thereby provide pointwise hot spots, which support the polymerization- and/or cross-linking reaction. Also here, the heat absorbing particles can be e.g. metal particles.

For forming the first and/or second adhesive layer 5, 6 according to a fourth variant of the invention, an adhesive can be utilized, which is enriched at least in certain regions with a component, which is heatable inductively under the action of LF- or HF-fields Such components can be e.g. ferromagnetic alloys or metals, such as nickel-iron. These components are also detectable in the adhesive layer after the curing. The adhesive layer contains, consequently, also in the cured state, residues of an LF- or HF-field absorbing component.

A special advantage of heating with microwaves, induction or also of the micro-encapsulation is the locally limited effect and, thus, a polymerization, which protects surrounding materials. In such case, the heat input for this polymerization is very small.

After started polymerization, the adhesive layer can be only pre-affixed or else completely cured in one process step. In the case of a pre-affixing, a heat treatment can follow for bringing about a complete polymerization. In such case, the heat input can advantageously be selected smaller, so that also in this case, a heat protecting manufacture for the residual components is possible (thus protecting e.g. the material of the piezo element or the material of the coupling element).

Known concepts for securement of a bearing plate are designed to connect the bearing plate immediately with the piezo element or the coupling body. Application of the aforementioned adhesives permit a stepped curing of the adhesive.

In the case of application of a photochemically curable adhesive and with irradiation as shown in FIGS. 2 and 3, the irradiation e.g. with ultrasonic waves and/or microwaves effects a lateral affixing of the metal disk 4 to the coupling element 3. This is understood as a type of pre-affixing, or tacking. This lateral affixing respectively between coupling element and metal disk and between metal disk and piezo element protects these elements against slipping before a final curing occurs.

After transpired pre-affixing, depending on intensity of the irradiation, a fine adjustment, respectively fine orientation, of the individual components of the ultrasonic transducer arrangement can still occur.

A final curing and therewith an affixing can occur, for example, right after the pre-affixing, in a furnace or alternatively by full surface irradiation of the coupling element 3, to the extent that coupling element 3 is transparent relative to the polymerization promoting radiation, e.g. UV radiation.

In a third ultrasonic transducer arrangement of the invention, the applied adhesive can contain a micro-encapsulated, polymerization activating component, which is releasable under the action of ultrasonic waves.

A special advantage of this variant is that the ultrasonic waves of the ultrasonic transducer can burst the micro-encapsulations. In a first frequency, which corresponds to the resonant frequency of the micro-capsules, thus, the capsules are caused to burst. Ultrasonic waves are transmitted as measurement signals with a second frequency. A user can determine a percentage of capsules it would like to burst as a function of the duration of the frequency. Thus, it is possible to pre-affix, to orient and, finally, to affix the metal disk.

The aforementioned securement methods hold preferably both for forming the first as well as also the second adhesive layer.

The irradiation of the lateral regions of the metal disk, respectively the adhesive layers, for pre-affixing can be achieved by positioning a radiation source in this lateral region.

It is, however, also possible to embody the coupling element 3 in such a manner that a free space 8 is present between the edge of the metal disk 4 and the edge of the piezo element and the inner surface of the cavity 7. An ultrasonic transducer with such a coupling element 3 is shown in FIGS. 2 and 3.

The radiation S from the radiation source, thus e.g. from the ultrasonic, microwave- or UV radiator, enters the free space 8 of the coupling element 3 and travels straight to a redirecting surface 9, where the radiation is redirected a. The redirecting surface 9 can be provided with a radiation reflecting layer or an ultrasonic wave reflecting layer. This occurs in FIG. 2 with an angle of 90°. In this way, the radiation is directed parallel or essentially parallel to the first and/or second adhesive layer 5, 6 and enables an edge curing for pre-affixing the components, respectively the piezo element 2, the metal disk 4 and the coupling element 3, on top of one another.

Then, a fine orientation of the metal disk or of the piezo element can occur, or a transport step can occur within a manufacturing plant.

Finally, a curing can occur by irradiating centrally located adhesive through the coupling element or by thermally curing the adhesive. In such case, preferably a smaller energy can be expended than in the case of a usual thermal cross-linking without previous photochemical curing.

Figure 4:
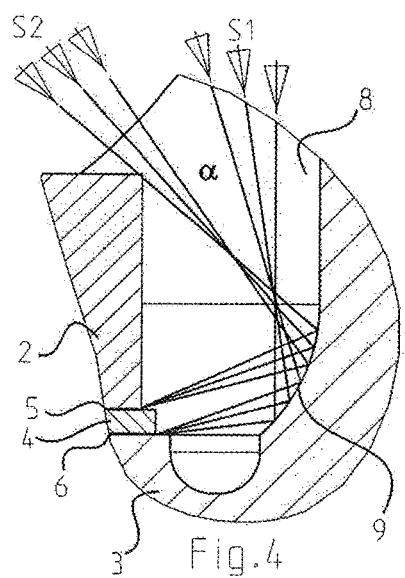
FIG. 4 is a detail view of a second ultrasonic transducer of the invention.

FIG. 4 shows another advantageous variant, which can be used e.g. for a photochemical curing, an ultrasonic wave- or a microwave activated curing. In such case, the coupling body includes a focusing surface 9. This can be milled into the coupling body and then coated with a layer, e.g. a metal layer, which turns and focuses incoming radiation or ultrasonic waves in the direction of the adhesive layers 5, 6.

Figure 6:
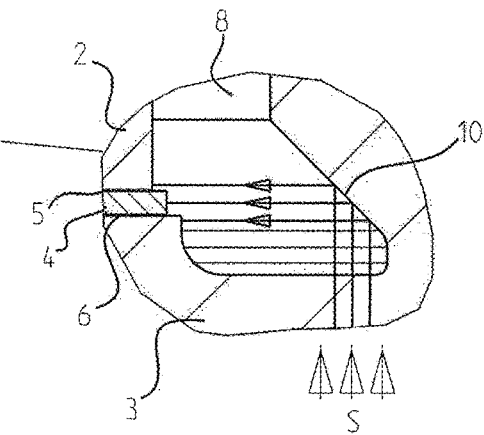
FIG. 6 is a detail view of the third ultrasonic transducer of the invention.

FIGS. 5 and 6 show a variant, in the case of which radiation or ultrasonic waves passing through the coupling body 3 are reflected on a redirecting surface 10 laterally in the direction of the adhesive layers 5 and 6. In this version, the redirecting surface is coated with a reflecting layer, which provides a reflecting surface.

Figure 7:
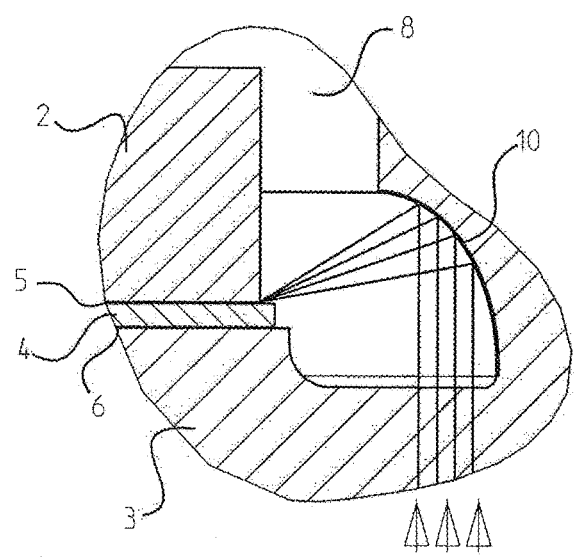
FIG. 7 is a detail view of a fourth ultrasonic transducer of the invention.
Figure 8:
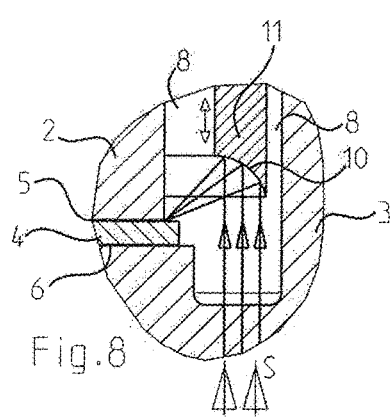
FIG. 8 is a detail view of a fifth ultrasonic transducer of the invention.

FIGS. 7 and 8 show respective variants of the focusing, which supplementally focus the incoming radiation or ultrasonic waves and thereby steer such with targeting onto the lateral region of the adhesive layer.

In FIG. 7, this occurs on a focusing surface 10, which is a reflecting layer applied on the coupling element 3. The contour, respectively bulge, of the focusing surface 10 can be integrally worked into the coupling body 3.

In FIG. 8, the focusing occurs with the aid of a special focusing element 11, which protrudes inwardly into the free space 8. This focusing element 11 provides a focusing surface 10, on which the turning and focusing of radiation or ultrasonic waves occurs. Focusing element 11 can be arranged releasably on the coupling element 3, so that it can be reused in the production process.

Of course, a corresponding focusing element can also be arranged in FIG. 4 in place of the focusing surface 9 there.

In an additional variant (not shown) of the invention, the adhesive layer can be provided with energy conductors, thus e.g. light conductors or sound conductors. These enable the energy- and/or radiation to be input exactly to the position to be adhered.

The invention claimed is:

1. An ultrasonic transducer, comprising:
   a coupling element;
   a metal disk; and
   a piezo element, wherein:
   between said coupling element and said piezo element said metal disk is arranged;
   said metal disk is connected with said piezo element or with said coupling element by means of an adhesive layer;
   said adhesive layer is producible, at least in certain regions, by means of a photochemically curable adhesive; and
   said coupling element has a focusing surface for focusing UV radiation or microwaves, or ultrasonic waves, onto a lateral region of the adhesive layer.

2. The ultrasonic transducer as claimed in claim 1, wherein:
   said adhesive layer has non-reacted photo initiators or residual monomers, with functional groups, which form chemical bonds or radicals under the action of light- or microwave radiation.

3. The ultrasonic transducer as claimed in claim 1, wherein:
   said metal plate has an area facing said piezo element with a geometric center of gravity; and the degree of cross-linking of the adhesive layer decreases toward this center of gravity.

4. The ultrasonic transducer as claimed in claim 1, wherein:
   said adhesive layer is cross-linked in an edge region of the metal disk photochemically or by microwave incidence and thermally cross-linked in a central region of the metal disk.

5. The ultrasonic transducer as claimed in claim 1, wherein:

said coupling element has a coupling surface facing the measured medium for in- and/or out-coupling of an ultrasonic, wanted signal into and out of said coupling element; and said coupling element has at least one reflecting surface, which redirects a UV radiation or microwave radiation, or ultrasonic waves, entering from said coupling surface into said reflecting element and into the edge region of said metal disk.

6. The ultrasonic transducer as claimed in claim 1, wherein:

said adhesive layer is produced from a 2-component adhesive, wherein at least one component is surrounded by micro-encapsulation.

7. The ultrasonic transducer as claimed in claim 1, wherein:

within a cavity of said coupling element, in which cavity said piezo element and said metal disk are arranged, a focusing element and/or reflection element are/is arranged, for focusing and/or redirecting a UV radiation or microwave radiation, or ultrasonic waves.

8. The ultrasonic transducer as claimed in claim 1, wherein:

said coupling element is at least partially transparent and/or microwave transmissive.

9. The ultrasonic transducer as claimed in claim 1, wherein:

said adhesive layer is arranged both between said piezo element and said metal disk, as well as also between said metal disk and said coupling element;

and said adhesive layer between said metal disk and said coupling element has preferably the same chemical composition as the adhesive layer between said metal disk and said piezo element.

* * * * *